United States Patent

Jordan

Patent Number: 5,649,711
Date of Patent: Jul. 22, 1997

[54] SEALING CONFIGURATION

[75] Inventor: Holger Jordan, Leinfelden-Echterdingen, Germany

[73] Assignee: Busak + Shamban GmbH & Co., Stuttgart, Germany

[21] Appl. No.: 624,640

[22] PCT Filed: Oct. 18, 1994

[86] PCT No.: PCT/DE94/01231

§ 371 Date: Apr. 10, 1996

§ 102(e) Date: Apr. 10, 1996

[87] PCT Pub. No.: WO95/11395

PCT Pub. Date: Apr. 27, 1995

[30] Foreign Application Priority Data

Oct. 20, 1993 [DE] Germany .......................... 43 35 788.1

[51] Int. Cl.$^6$ ...................................................... F16J 9/20
[52] U.S. Cl. .......................... 277/165; 277/152; 277/205; 277/173
[58] Field of Search ........................... 277/165, 152, 277/205, 173

[56] References Cited

U.S. PATENT DOCUMENTS

| | | | |
|---|---|---|---|
| 2,509,436 | 5/1950 | Isenbarger | 277/205 |
| 3,377,076 | 4/1968 | Burnett | 277/177 |
| 3,527,507 | 9/1970 | Clark et al. | 277/205 |
| 3,642,293 | 2/1972 | Woodling . | |
| 3,942,806 | 3/1976 | Edlund | 277/165 |
| 4,060,023 | 11/1977 | Vegella | 277/205 |
| 4,268,045 | 5/1981 | Traub | 277/121 |
| 4,417,503 | 11/1983 | Izumi . | |
| 4,553,761 | 11/1985 | Blesing et al. | 277/205 |
| 4,717,161 | 1/1988 | Stremeckus | 277/205 |
| 5,328,178 | 7/1994 | Nies | 277/152 |

FOREIGN PATENT DOCUMENTS

| | | | |
|---|---|---|---|
| 2030747 | 11/1970 | France | F16J 15/00 |
| 2365738 | 4/1978 | France | F16J 15/32 |
| 3014797 | 10/1980 | Germany | F16J 15/16 |
| 3738512 | 5/1989 | Germany . | |
| 2050534 | 1/1981 | United Kingdom | 277/205 |

OTHER PUBLICATIONS

Heinz Konrad Müller: Abdichtung bewegter Maschinenteile, Medienverlag Ursula Müller, Waiblingen/Germany, 1990, pp. 163/204.

*Primary Examiner*—William A. Cuchlinski, Jr.
*Assistant Examiner*—Christina Annick
*Attorney, Agent, or Firm*—Paul J. Vincent

[57] ABSTRACT

A rubber elastic sealing ring 13 is arranged between two concentric machine parts 11, 12 moved towards each other. The sealing ring 13 has a surface 22 that on the one hand ends in a dynamic sealing edge 21 and on the other hand extends to the low pressure side N. In addition, an outer peripheral surface 25 of the sealing ring 13 is inclined towards the bottom 18 of the groove in the non-compressed state of the sealing ring 13. Imaginary planes 35, 36 extend through the ring-shaped conical surfaces 22, 25. The imaginary planes 35, 36 are also conical ring-shaped surfaces that form an intersection line 37. The intersection line 37 is always located between one plane 34 (ring-shaped surface) and the peripheral surface 15 of the second machine part 12.

7 Claims, 2 Drawing Sheets

SEALING CONFIGURATION

BACKGROUND OF THE INVENTION

The invention concerns a rubber elastic sealing ring between two concentric machine components moved towards each other and holding the sealing ring held in place within a groove in the first machine component opening towards the second machine component and formed from a groove bottom and groove sides, the sealing ring seating, with a dynamic sealing edge, on a peripheral surface of a second machine component which forms a first wedge-shaped gap together with a first surface extending from the dynamic sealing edge towards the low pressure side N, the sealing ring forming a second wedge-shaped gap with an outer peripheral surface supported on the bottom of the groove opening toward the low pressure side N, the sealing ring defining a first plane orthogonal to the longitudinal axis of the second machine component and intersecting the dynamic sealing edge beyond which a first and a second sealing ring section, separated by a cut, extend towards the high pressure side H, whereby the first sealing section is defined by at least one surface with one end at the dynamic sealing edge and the second sealing ring section protrudes beyond the first sealing ring section towards the high pressure side H and is formed by the outer peripheral surface and by a fourth and fifth plane intersecting each other and forming a shoulder and a line of intersection which is separated from the bottom of the groove and which defines a second plane running parallel to the longitudinal axis.

A seal of this type is known in the art through DE 37 38 512 A1.

With the conventional seal, the sealing ring is surrounded at the low pressure side by a conically shaped support ring. The support ring largely accepts the forces acting on the sealing ring when pressure is applied so that the dynamic sealing edge is pressure relieved. Furthermore, a first wedge-shaped gap is arranged between the support ring and the sealing ring into which the sealing ring is drawn when pressure is applied. The first wedge-shaped gap is thereby closed by the application of pressure. A second wedge-shaped gap is provided for on the groove bottom of the conventional sealing ring and is closed by further application of pressure to pressure relieve the dynamic sealing edge. By means of the tilt in the angle of the gaps and the roughness of the diagonal surfaces of the support ring, it is possible to adjust the pressuring force of the dynamic sealing edge to the particular pressure and material conditions.

Although the dynamic sealing edge is pressure relieved by the reaction of the conventional sealing ring to the application of pressure, a wedge-shaped gap, necessary for the return transport performance of a sealing ring, is not formed. Completely absent is a pressing gradient formed towards the low pressure side and having a flat dependence. For these reasons the dynamic sealing edge can be destroyed by extrusion and the life-time of the sealing ring can be reduced.

It is therefore the underlying purpose of the invention to further improve the conventional sealing configuration in such a fashion that the gap between the machine components is securely sealed even in an unpressurized state and improved endurance is exhibited in the pressurized state.

SUMMARY OF THE INVENTION

This purpose is achieved in accordance with the invention in that a line of intersection between a third and a fourth plane, in which the outer peripheral surface and the first surface are located in the undeformed state of the sealing ring, lies in a region between the second plane and the peripheral surface of the second machine part and that the sealing ring is configured between the first plane and the low pressure side N as a solid body, and the sealing ring exhibits a third wedge-shaped gap when seated in the groove in the unpressurized state which opens towards the bottom of the groove and is formed from the low pressure side of the groove and a bordering sealing ring surface.

The deformation-free state of the sealing ring in accordance with the invention refers to the shape of the sealing ring in which it is produced having an over-dimension with respect to the groove space when not under tension or pressure.

The expression solid body refers to a material section which is produced without substantial cuts and which exhibits deformation characteristics corresponding to a massive block of material.

The shape of the sealing ring in accordance with the invention is configured in such a fashion that the sealing ring exhibits a second wedge-shaped gap in the vicinity of the line of intersection of the bottom of the groove and the low pressure side of the groove in the deformation-free state.

This second wedge-shaped gap is maintained, although to a reduced extent, in the installed state as well as in the pressurized state of the sealing ring in accordance with the invention. The second wedge-shaped gap allows for the outward pivoting into the free space formed by the second wedge-shaped gap during operation of the sealing ring.

Furthermore the sealing ring in accordance with the invention exhibits a third wedge-shaped gap facing the bottom of the groove in the installed and non-pressurized state. This third wedge-shaped gap is closed under the application of pressure. For pressurized applications of the sealing ring, the third wedge-shaped gap facilitates pivoting out into the free space formed by the third wedge-shaped gap.

An increasing pressurization of the sealing rings leads to a contraction of the sealing ring in the axial direction and a stretching of the sealing ring in the radial direction due to its rubber elastic material properties. The sealing ring in accordance with the invention can deform in such a fashion that pivotings into the second and third wedge-shaped gaps are possible. The dynamic sealing edge can thereby be pressure relieved.

The tendency of the sealing elements to extrude is also significantly improved. The sealing ring in accordance with the invention thereby has the essential advantage that a substantial interference between the sealing ring and the groove space is reduced in the installed state of the sealing ring in such a fashion that increased pressure on the dynamic sealing edge does not occur. The sealing edge thereby exhibits reduced frictional values relative to conventional sealing rings. Reduced wear and increased endurance thereby result.

A stable pressure distribution establishes itself in the vicinity of the sealing edge so that one guarantees maintenance of the first wedge-shaped gap opening towards the low pressure side N. The first wedge-shaped gap remains undiminished even after very long operating times. In this fashion the return transport drag performance of a fluid from the low pressure region into the high pressure region is guaranteed when the second machine component is, for example, a rod exercising a back and forth motion relative to the first machine component.

The first wedge-shaped gap facing towards the low pressure side N in the vicinity of the dynamic sealing edge is in direct functional relationship with the second wedge-shaped gap in the vicinity of the groove bottom. In the installed pressurized state, corresponding forces are present on the sealing ring in accordance with the invention in the vicinity of the first and the second wedge-shaped gaps. The working connection between the first and the second wedge-shaped gaps is facilitated by the mutual alignment of the outer peripheral surface and the first surface of the sealing ring. The alignment is determined by the position of the line of intersection of the defined third and fourth planes and of the third wedge-shaped gap.

The biasing of the rubber elastic sealing ring in accordance with the invention in the installed state transpires through material deformation of the sealing ring shape largely in front of the sealing edge so that one guarantees that nearly no biasing forces act in the radial direction in the low pressure region of the sealing ring in the area behind the sealing edge.

The degree of deformation of the sealing ring in accordance with the invention in the installed and in the pressurized state can also be influenced through the selection of the elastic material.

A cut in the sealing ring in accordance with the invention separates two sealing ring sections facing the high pressure side H. The cut acts, under application of pressure, like a hinge which can be opened or closed under the action of loads of greater or lesser strength. A sealing ring configured in this fashion can act as a so-called check valve to reliably transport fluid from the low pressure side to the high pressure side when the fluid on the low pressure side N is subjected to a larger force than the fluid on the high pressure side H.

In an improvement of the invention the sealing ring forms a second wedge-shaped gap with the low pressure side of the groove in the installed state which opens towards the bottom of the groove and which exhibits a larger radial extent for low pressure sealing ring applications than for high pressure sealing ring applications. This has the advantage that the pressure response of the sealing ring in accordance with the invention can be individually adjusted to particular applications. Low as well as high fluid pressure increases can produce comparable pressure relief on the dynamic sealing edge of the the sealing ring when the sealing ring shape is cast in accordance with the teaching of the invention.

In further configurations of the invention the sealing ring is separated from the bottom of the groove in the pressurized state in the corner region of the groove bottom and at the low pressure side of the groove. This has the advantage that the dynamic sealing edge of the sealing ring is capable of pressure relief to the extent that the sealing ring can be pressed by means of an increased fluid pressure into the free space at the low pressure side of the groove bottom.

In a further embodiment of the present invention the solid body of the sealing ring exhibits an axial length in the deformation-free state which is limited to 2.2 times the length of the second sealing ring section and the sealing ring surface runs parallel to the low pressure side of the groove in the deformation-free state of the sealing ring.

This has the advantage that the solid body of the sealing ring in accordance with the invention is deformable due to its rubber elasticity in such a fashion that the third wedge-shaped gap is closed and the second wedge-shaped gap is reduced when pressure is applied. The sealing ring is thereby capable of reacting to increased applied pressures by pressure relieving the dynamic sealing edge.

In a particularly preferred embodiment of the sealing ring in accordance of the invention a deformation causes the third wedge-shaped gap of the sealing ring in the installed unpressurized state.

The sealing ring in accordance with the invention is pivoted during installation in that it is strongly pressed against the low pressure side of the groove. Towards this end the sealing ring can be configured in a partial section of the third wedge-shaped gap which opens towards the bottom of the groove. In this fashion the free space located on the low pressure side, as defined by the second wedge-shaped gap, is automatically enlarged when installing the sealing ring and, under the application of pressure, the sealing ring in accordance with the invention can fill-up this free space in that it is pressed into this free space to a greater or lesser degree by the applied pressure. In this fashion a sealing ring is created which, with increased fluid pressure, can, depending on the dimensions, be ever increasingly pressure relieved.

In a further embodiment of the present invention, the solid body of the sealing ring exhibits, in the deformation-free state, an axial length which is larger than 2.2 times the length of the second sealing ring section, and the sealing ring exhibits, in its finished state, a sealing ring surface which slants with respect to the longitudinal axis of the second machine part and which defines, in the installed and pressureless states of the sealing ring and together with the low pressure side of the groove, the third wedge-shaped gap.

Sealing rings in accordance with the invention of this length are, due to their torsion stiffness, no longer capable of pivoting in order to form a third wedge-shaped gap towards the low pressure side. Also with these embodiments, which can be installed in a rectangularly shaped groove, a third wedge-shaped gap establishes itself due to the slanted sealing ring surface.

In another improvement of the sealing ring in accordance with the invention the solid body portion of the sealing, which exceeds 2.2 times the axial length of the second section of the sealing ring, exhibits a second outer peripheral surface forming an angle relative to the bottom of the groove which is smaller than the angle between the first outer peripheral surface and the bottom of the groove.

Due to a reduced tilting of the second outer peripheral surface relative to the first outer peripheral surface, the pressurized sealing ring can seat over an increased area on the low pressure side of the groove and on the groove bottom. The static sealing seating behaviour of the sealing ring is thereby stabilized. The reliability of the static sealing thereby positively influences the stabilization of the pressure distribution of the sealing ring, in particular at the dynamic sealing edge.

Further advantages can be derived from the description of the accompanying drawing. Likewise the above mentioned features and those which are to be described further below in accordance with the invention can be utilized individually or collectively in arbitrary combination. The embodiments mentioned are not to be taken as exhaustive enumeration rather have exemplary character only.

The invention is represented in the drawing and will be described more closely with regard to the embodiments.

DESCRIPTION OF THE PREFERRED EMBODIMENT

Figure 1:
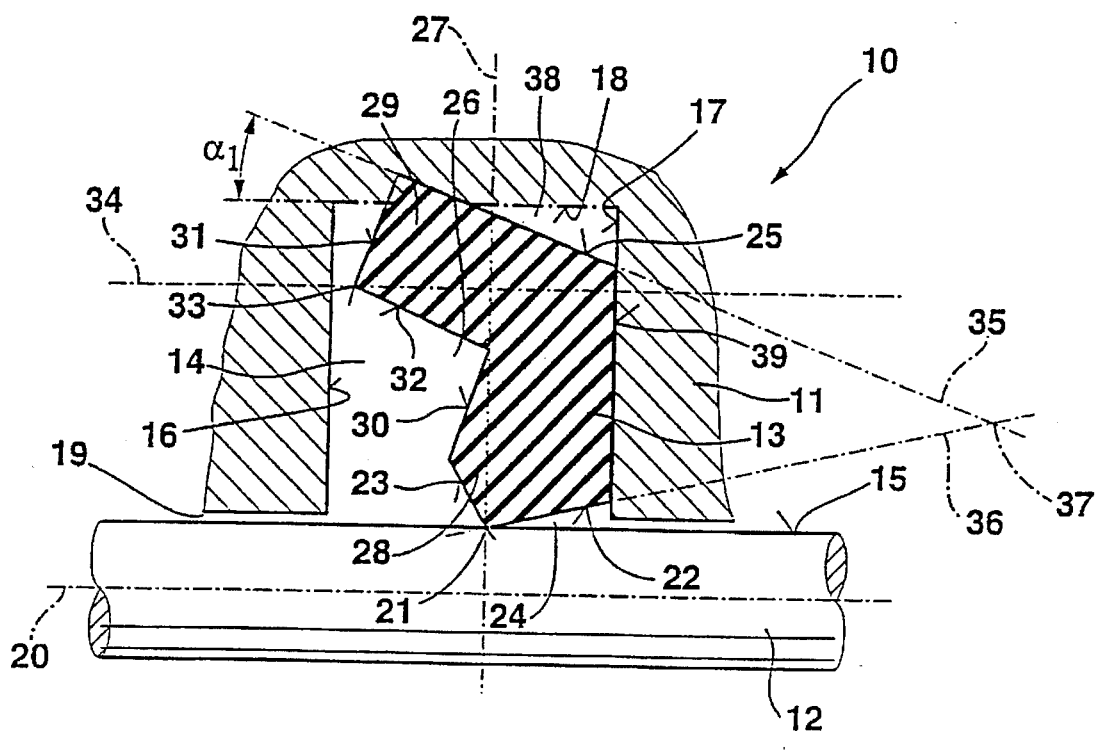
FIG. 1 shows a cross-section of a sealing ring in accordance with the invention whose solid body, in the deformation-free state, exhibits an axial length which is limited to 2.2 times the length of the second sealing ring section in the deformation-free state.

The individual figures of the drawing show the object in accordance with the invention in a strongly schematic fashion and are not to be taken to scale. The individual proportions of the sealing ring can differ as long as one guarantees that the finished sealing ring exhibits an over dimension at the high pressure side H relative to the groove provided for which changes into an under dimension towards the low pressure side.

The same reference symbols are utilized for the same features in FIGS. 1 through 4.

FIG. 1 shows a sealing configuration 10 comprising a first machine component 11, a second machine component 12 and a sealing ring 13. The concentric machine components 11, 12 can move with respect to each other. That is to say, the machine components can exercise a rotation or a back and forth motion relative to each other.

A groove 14 is formed in the first machine component 11 which opens towards a peripheral surface 15 of the second machine component 11. The groove 14, for its part, is formed from a high pressure groove side 16, a low pressure groove side 17, and a groove bottom 18. The machine components 11, 12 are separated from each other by means of a gap 19.

The sealing ring 13 exhibits a longitudinal axis which corresponds to the longitudinal axis 20 (symmetry axis) of the second machine component 12. A dynamic sealing edge 21 of the sealing ring 13 is formed from the line of intersection of a first surface 22 and a second surface 23. Clearly, the second surface 23 can also extend up to the step in the sealing ring 13. The first surface 22 forms, together with the peripheral surface 15, a first wedge-shaped gap 24 which opens towards the low pressure side N even when the seal is pressurized (see FIG. 3). An outer peripheral surface 25 is formed on the sealing ring 13 opposite the groove bottom 18 which, in the vicinity of a static seal, is adjacent to the bottom of the groove 18.

In FIG. 1, the sealing ring 13 is shown in the completely unloaded produced state. The sealing ring 13 is, in FIG. 1, assigned to a groove 14, whereby the groove bottom 18 is shown with dot-dashed lines so that the outer contours of the sealing ring 13 in the produced, non-biased state, can be shown. An interference can be seen in FIG. 1, that is to say, the sealing ring 13 is over-dimensioned relative to the groove 14.

The sealing 13 furthermore exhibits two sealing ring sections 28, 29 separated by a cut 26 which project beyond a first plane 27 towards the high pressure side H. The first plane 27 runs perpendicular to the longitudinal axis 20 through the sealing edge 21. The first sealing ring section 28 is defined by the second surface 23 and a third surface 30. The second sealing ring section 29 is defined by a fourth surface 31 and a fifth surface 32. The fourth surface 31 and the fifth surface 32 intersect each other at a line of intersection 33 to form a shoulder. The line of intersection 33 defines a second plane 34 which runs parallel to the longitudinal axis 20 through the line of intersection 33. The outer peripheral surface 25 lies in a third plane 35 representing an outer surface cone which has a common line of intersection 37 with a fourth plane 36 representing an inner surface cone. The fourth plane 36 is defined in that the first surface 22 lies therein. The line of intersection 33 is located in a space which is defined by the peripheral surface 15 and the second plane 34.

The outer peripheral surface 25 which borders on the high pressure sided fourth surface 31 of the sealing ring 13, is tilted relative to the longitudinal axis 20, whereby the longitudinal axis 20 defines an angle $\alpha_1$ with the outer peripheral surface 25. It can seen from the figure that the over-dimensioning which is formed in the region of the line of intersection of the outer peripheral surface 25 and the high pressure sided fourth surface 31, ends in the vicinity of the dynamic sealing edge 21. In the remaining region of the outer surface 25, the sealing ring 13 is produced with an under-dimensioning, that is to say, a second wedge-shaped gap 38 forms in the vicinity of the groove bottom 18 and of the low pressure side of the groove 17. The sealing ring 13 itself is produced in such a fashion that it is adjacent, at one of its radially extended sealing ring low pressure surfaces 39, to the low pressure side of the groove 17.

Figure 2:
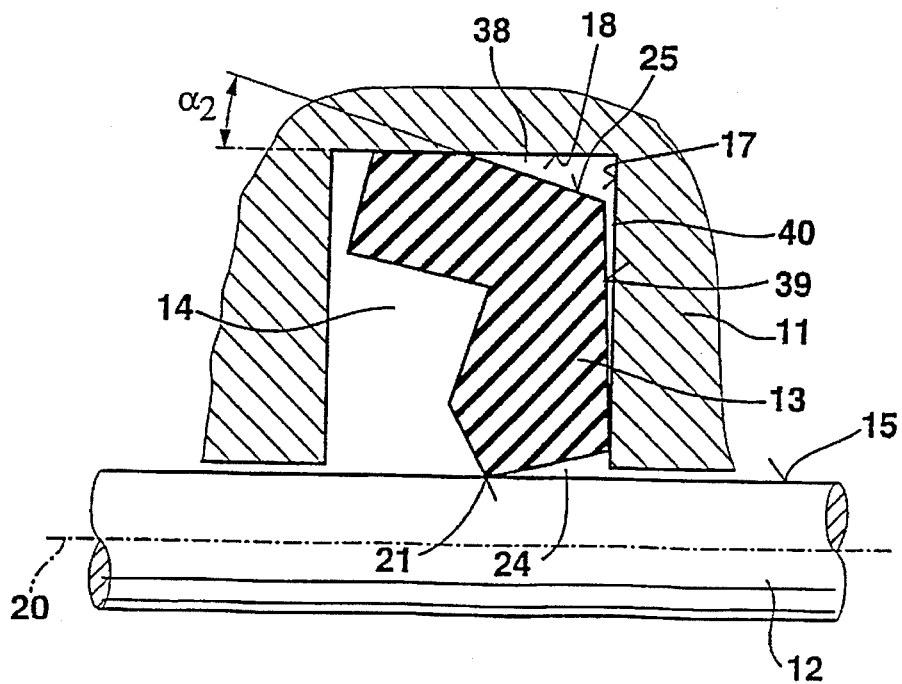
FIG. 2 shows a cross-section of a sealing ring in accordance with the invention according to FIG. 1 in the installed state.

FIG. 2 shows a cross-section of the sealing ring 13 in the installed state between the machine components 11, 12. The sealing ring 13 seats, via the dynamic sealing edge 21, on the peripheral surface 15 of the second machine component 12. The sealing ring 13 is biased in the groove 14 so that the sealing ring 13 is deformed in such a fashion that an angle $\alpha_2$ between the longitudinal axis 20 and the outer peripheral surface 25 is established which is smaller than the angle $\alpha_1$ as shown in FIG. 1. The second wedge-shaped gap is maintained in the vicinity of the low pressure side of the groove 17 towards the groove bottom 18 even after installation of the sealing ring 13. By means of the deformation of the sealing ring 13 in the installed state, the third wedge-shaped gap 40 is formed between the low pressure side of the groove 17 and the adjacent sealing low pressure surface 39 of the sealing ring 13. The first wedge-shaped gap 24 is also formed in the installed state.

Figure 3:
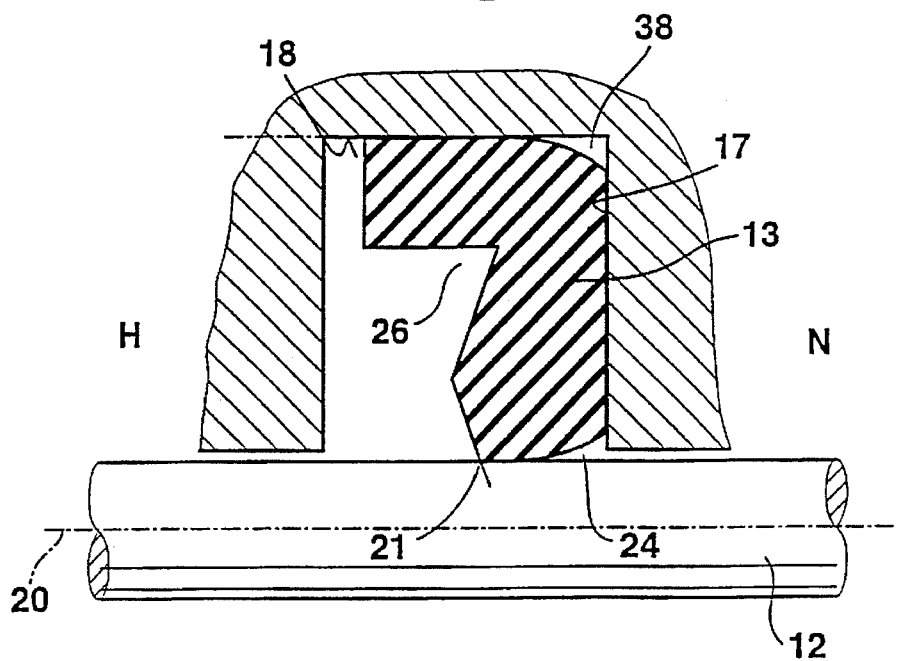
FIG. 3 shows a cross-section of the sealing ring in accordance with the invention according to FIG. 1 in the pressurized state.

FIG. 3 shows the sealing ring 13 of FIG. 1 and FIG. 2 in the pressurized state. H designates the high pressure side and N the low pressure side. The sealing ring 13 exhibits, as seen from the high pressure side H, the cut 26 which serves the function of a hinge under the application of pressure. The sealing ring 13 is, under pressure, pressed into the free space defined by the second and third wedge-shaped gaps 38, 40. The sealing edge 21 is pressure relieved by the deflection of the sealing ring 13. The first wedge-shaped gap 24 as well as the second wedge-shaped gap 38 are also present under the application of pressure. The third wedge-shaped gap 40 can completely close under the application of pressure so that the sealing edge surface 39 seats on the low pressure side of the groove 17.

Figure 4:
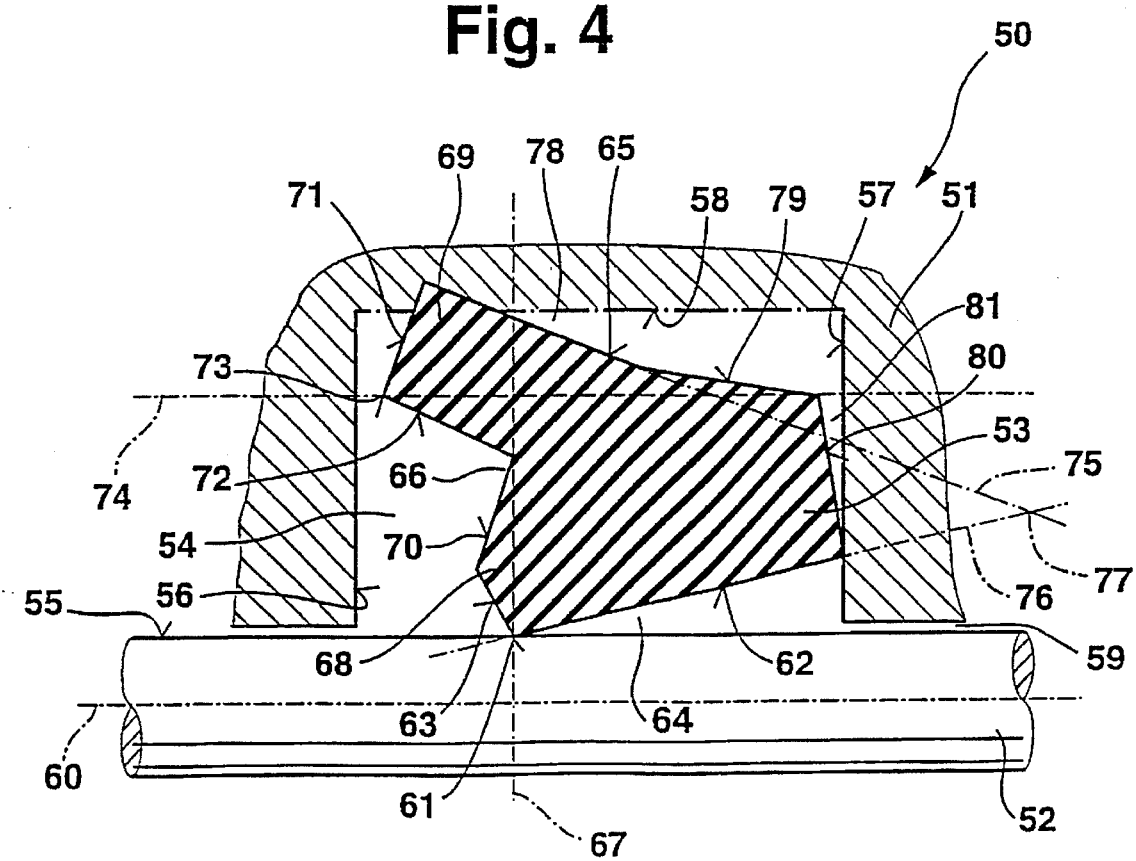
FIG. 4 shows a cross-section of the sealing ring in accordance with the invention whose solid body, in the deformation-free state, exhibits an axial length which is larger than 2.2 times the length of the second sealing ring section in the deformation-free state.

FIG. 4 shows a sealing configuration 50 which comprises a first machine component 51, a second machine component 52 and a sealing ring 53. The concentric machine components 51, 52 can move with respect to each other. That is to say, the machine components can exercise a rotation or a back and forth motion with respect to each other.

A groove 54 is formed in the first machine component 51 which opens towards the peripheral surface 55 of the second machine component 52. The groove 54 itself is formed from a high pressure side of the groove 56, a low pressure side of the groove 57 and a groove bottom 58. The machine components 51, 52 are separated from each other by means of a gap 59.

The sealing ring 53 exhibits a rotational axis 60 which corresponds to the longitudinal axis 20 (symmetry axis) of the second machine component 52. A dynamic sealing edge 61 of the sealing ring 53 is formed from the line of intersection of a first surface 62 and a second surface 63. Clearly, the second surface 63 can also extend up to the step in the sealing ring 53. The first surface 62 forms a first wedge-shaped gap 64 with the peripheral surface 55 which, even when the seal is subjected to pressure, is opened towards the low pressure side N (see FIG. 3). A first outer peripheral surface 65 is formed on the sealing ring 53 opposite the groove bottom 58 and is adjacent to the bottom of the groove 58 in the vicinity of a static seal.

FIG. 4 shows the sealing ring 53 in a completely unloaded state, as it is produced. The sealing ring 53 is, in FIG. 4, assigned to a groove 54 whereby the bottom of the groove 58 is shown as a dot-dashed line so that the outer contours of the sealing ring 53 can be shown in the produced, non-pressurized state. An interference can be seen in FIG. 4, that is to say, the sealing ring 53 exhibits an over-dimension relative to the groove 54.

The sealing ring 53 furthermore exhibits two sealing ring sections 68, 69 which are separated by a cut 66 and which extend past a first plane 67 towards the high pressure side H. The first plane 67 runs perpendicular to the longitudinal axis 60 through the sealing edge 61. The first sealing ring section 68 is defined by the second surface 63 and a third surface 70. The second sealing ring section 69 is defined by a fourth surface 71 and a fifth surface 72. The fourth surface 71 and the fifth surface 72 intersect each other at an intersection line 73 and form a shoulder. The line of intersection 73 defines a second plane 74 which runs parallel to the longitudinal axis 60 through the line of intersection 73. The first outer peripheral surface 65 lies in a third plane 75 representing an outer surface cone which shares a common line of intersection 77 with a fourth plane 76 representing an inner surface cone. The fourth plane 76 is defined in that the first surface 62 lies therein. The line of intersection 77 is located in a region which is defined by the peripheral surface 55 and the second plane 74.

The first outer peripheral surface 65, which borders on the high pressure sided fourth surface 71 of the sealing ring 53, is tilted relative to longitudinal axis 60, whereby the longitudinal axis 60 defines an angle $\alpha_1$ relative to the first outer peripheral surface 65. As can be seen in the figure, the over-dimensioning which is formed in the region of the line of intersection of the first outer peripheral surface 65 and the high pressure sided fourth surface 71 ends in the vicinity of the dynamic sealing edge 61. In the remaining region of the first outer peripheral surface 65, the sealing ring 53 is produced with an under-dimension, that is to say, a second wedge-shaped gap 78 forms in the vicinity of the groove bottom 58 and of the low pressure side of the groove 57. A second outer peripheral surface 79 of the sealing ring 53 forms an angle with the groove bottom 58 which is smaller than the angle between the first outer peripheral surface 65 and the groove bottom 58.

The sealing ring 53 itself is manufactured in such a fashion that it seats with a slanted sealing ring surface 80 on the low pressure side of the groove 57 in such a fashion that a third wedge-shaped gap 81 is formed in the deformation-free state of the sealing ring 53. The wedge-shaped gap 81 is defined by the groove side 57 and the sealing ring surface 80. The third wedge-shaped gap 81 closes with increasing applied pressure so that the sealing ring low pressure surface 80 seats with its entire radial length on the low pressure side of the groove 57.

A sealing ring 13 between two concentric mutually movable machine components 11, 12 is manufactured from a rubber elastic material and is inserted in a groove 14 which is opened from the first machine component 11 towards the second machine component 12. The sealing ring 13 exhibits an over dimension relative to the groove 14 in which the sealing ring 13 is to be inserted which is formed at the high pressure side region of the sealing ring 13. In the low pressure sided region of the sealing ring 13, the sealing ring 13 is manufactured with an under dimension. The outer peripheral surface 25 lying across from the bottom of the groove 18 exhibits an angle $\alpha_1$ relative to the longitudinal axis 20 in the completely unloaded state of the sealing ring 13 which is reduced to an angle $\alpha_2$ in the installed position of the sealing ring. The second wedge-shaped gap 38, formed in the installed state of the sealing ring 13 in the vicinity of the low pressure side of the groove 17 and of the groove bottom 18, is also maintained in the pressurized state of the sealing ring 13. A first wedge-shaped gap 24 is formed between the peripheral surface 15 of the second machine component 12 and the sealing ring 13 which also is maintained under applied pressure.

I claim:

1. A rubber elastic sealing ring for sealing between first and second mutually concentric machine components which are movable with respect to each other, the second machine component having a peripheral surface and a longitudinal axis, the first machine component defining a groove opening towards the peripheral surface, the groove having a low pressure side, a high pressure side, and a groove bottom, the first and second machine components holding the sealing ring within the groove, the sealing ring comprising:

a dynamic sealing edge for seating on the peripheral surface and for defining a first plane orthogonal to the longitudinal axis passing through said sealing edge;

a first section for projecting beyond said first plane towards the high pressure side, said first section having a first section surface ending in said sealing edge;

a second section for projecting towards the high pressure side axially beyond said first section, said second section and said first section defining a cut separating said first and said second sections, said second section having a lower surface, an upper surface and a first outer surface, said lower and upper surfaces intersecting at a first intersection ring and defining together with said first outer surface, a shoulder, said first intersection ring being separated from the groove bottom, said first outer surface for seating on the groove bottom and for defining, with the groove bottom, an outer wedge-shaped gap which opens towards the low pressure side, said first outer surface for further defining, in a deformation-free state, an outer surface cone concentric with the longitudinal axis;

a sealing edge surface to extend from said dynamic sealing edge towards the low pressure side and for defining, together with the peripheral surface, an inner wedge-shaped gap opening towards the low pressure side, the sealing edge surface for defining, in the deformation-free state, an inner surface cone concentric with the longitudinal axis and intersecting said outer surface cone at a second intersection ring, said second intersection ring having a separation from the peripheral surface which is less than a separation of said first intersection ring from the peripheral surface; and a low pressure surface for defining, together with the low pressure side of the groove and in a state in which the sealing ring is installed in the groove and not subjected to pressure, a sideward wedge-shaped gap opening towards the groove bottom, wherein the sealing ring forms a solid body section between said first plane and said low pressure surface.

2. The sealing ring of claim 1, wherein the sideward wedge-shaped gap has a radial length which is larger for low pressure sealing ring applications than for high pressure sealing ring applications.

3. The sealing ring of claim 1, wherein the sealing ring is separated in a pressurized state from the groove bottom in a corner region between the groove bottom and the low pressure side.

4. The sealing ring of claim 1, wherein said solid body section has, in the deformation-free state, an axial length which is less than or equal to 2.2 times an axial length of said second section, and said low pressure surface extends parallel to the low pressure side of the groove in the deformation-free state.

5. The sealing ring of claim 4, wherein said sideward wedge-shaped gap is formed by deformation of the sealing ring in an installed pressureless state.

6. The sealing ring of claim 1, wherein said solid body section has an axial length in a deformation-free state which is larger than 2.2 times an axial length of said second section, and said low pressure surface is slanted relative to the longitudinal axis in the deformation-free state.

7. The sealing ring of claim 6, wherein said solid section has a second outer surface which forms an angle with the groove bottom which is smaller than an angle between said first outer surface and the groove bottom.

* * * * *